United States Patent [19]
Lord et al.

[11] Patent Number: 5,692,389
[45] Date of Patent: Dec. 2, 1997

[54] FLASH TANK ECONOMIZER

[75] Inventors: Richard G. Lord, Tullahoma, Tenn.;
Mark R. Rabbia, Brewerton, N.Y.;
Kevin J. Glover, Murfreesboro, Tenn.

[73] Assignee: Carrier Corporation, Syracuse, N.Y.

[21] Appl. No.: 672,745

[22] Filed: Jun. 28, 1996

[51] Int. Cl.⁶ ............... F25B 41/04; F25B 39/02; F25B 31/00
[52] U.S. Cl. ............... 62/222; 62/504; 62/505; 62/218
[58] Field of Search ............... 62/222, 223, 225, 62/504, 505, 218

[56] References Cited

U.S. PATENT DOCUMENTS

| | | | |
|---|---|---|---|
| 3,192,735 | 7/1965 | Bernhard | 62/222 |
| 4,523,435 | 6/1985 | Lord | 62/212 |
| 5,189,885 | 3/1993 | Ni | 62/117 |
| 5,285,653 | 2/1994 | Meloling et al. | 62/218 |
| 5,431,026 | 7/1995 | Jaster | 62/221 |

Primary Examiner—William Doerrler

[57] ABSTRACT

A flash tank economizer containing a first expansion device to expand high pressure refrigerant from a system condenser to an intermediate pressure and a second expansion device for further expanding liquid refrigerant at the intermediate pressure that has collected in the tank to a desired low pressure for delivery to the system evaporator. Vapor phase refrigerant produced by the first expansion in the tank is injected back into the system compressor at the intermediate pressure.

26 Claims, 4 Drawing Sheets

FLASH TANK ECONOMIZER

BACKGROUND OF THE INVENTION

This invention relates to a compact refrigeration chiller and, in particular, to a flash tank economizer for enhancing the performance of a compact refrigeration system without increasing the displacement of the system compressor.

In U.S. Pat. No. 4,523,435 there is described an electronically controlled expansion valve (EXV) mounted in the liquid line connecting the condenser and the evaporator of a refrigeration system. Refrigerant moving through the line is expanded in response to an input signal from a microprocessor. In this particular embodiment, the valve is adjusted in response to the amount of deviation between the actual (sensed) refrigerant superheat and the desired superheat. There is no suggestion in this patent of how this type of device could be put to use in other ways to further improve the performance efficiency or capacity of a refrigeration system.

A different type of refrigerant flow control device is disclosed in U.S. Pat. No. 5,285,653. In this device liquid refrigerant from the condenser is collected in the sump of a tank containing a vertically disposed stand pipe. Circumferentially spaced slotted openings pass through the lower section of the stand pipe through which liquid refrigerant collected in the tank is metered to the system evaporator. A gate is slidably contained in the stand pipe and is arranged to move vertically in response to a float that is floating on the liquid refrigerant in the sump. Accordingly, the size of the metering openings is varied by the gate in response to the level of refrigerant contained in the sump. The device provides a liquid seal between the condenser and the evaporator and insures that only liquid refrigerant is passed on to the evaporator.

As will be explained below, the present invention involves bringing together within a single pressure vessel an electronically controlled expansion valve and a float flow control device to greatly enhance the performance and capacity of a compact refrigeration system without having to increase the displacement of the system compressor. It also allows for a very compact and cost effective economizer.

SUMMARY OF THE INVENTION

It is therefore an object of the present invention to improve the operation and performance of a refrigeration system.

A further object of the present invention is to improve the performance of a compact refrigeration system without increasing the size or displacement of the system compressor.

A still further object of the present invention is to expand the liquid refrigerant moving between the condenser and the evaporator of a refrigeration system in stages to increase the efficiency of the system.

Another object of the present invention is to enhance the thermodynamic cycle of a refrigeration system to improve the capacity and efficiency of the system.

Yet another object of the present invention is to provide an improved compact flash tank economizer for use in a refrigeration system.

These and other objects of the present invention are attained by means of a compact refrigeration system that employs at least one screw compressor and a flash tank economizer which is mounted in the liquid line connecting the condenser with the evaporator of the system. High pressure liquid refrigerant entering the economizer tank is first expanded through an electronically controlled expansion valve to an intermediate pressure and the liquid phase of the expanded refrigerant is separated from the vapor phase within the tank. The liquid phase is collected in the sump of the tank and the vapor phase is collected in the upper section of the tank. A float type flow regulator is mounted in the sump of the tank and is arranged to expand the liquid refrigerant that is collected in the sump a second time to a still lower pressure. The twice expanded liquid refrigerant is then delivered to the evaporator while the flash gas vapor collected in the tank is injected back into the compressor thereby improving both the compressor capacity and the efficiency of the system without increasing the size of the system or the displacement of the system compressor.

BRIEF DESCRIPTION OF THE DRAWINGS

For a better understanding of these and other objects of the present invention, reference will be made to the following detailed description of the invention that is to be read in association with the accompanying drawings wherein.

DESCRIPTION OF THE INVENTION

Figure 1:
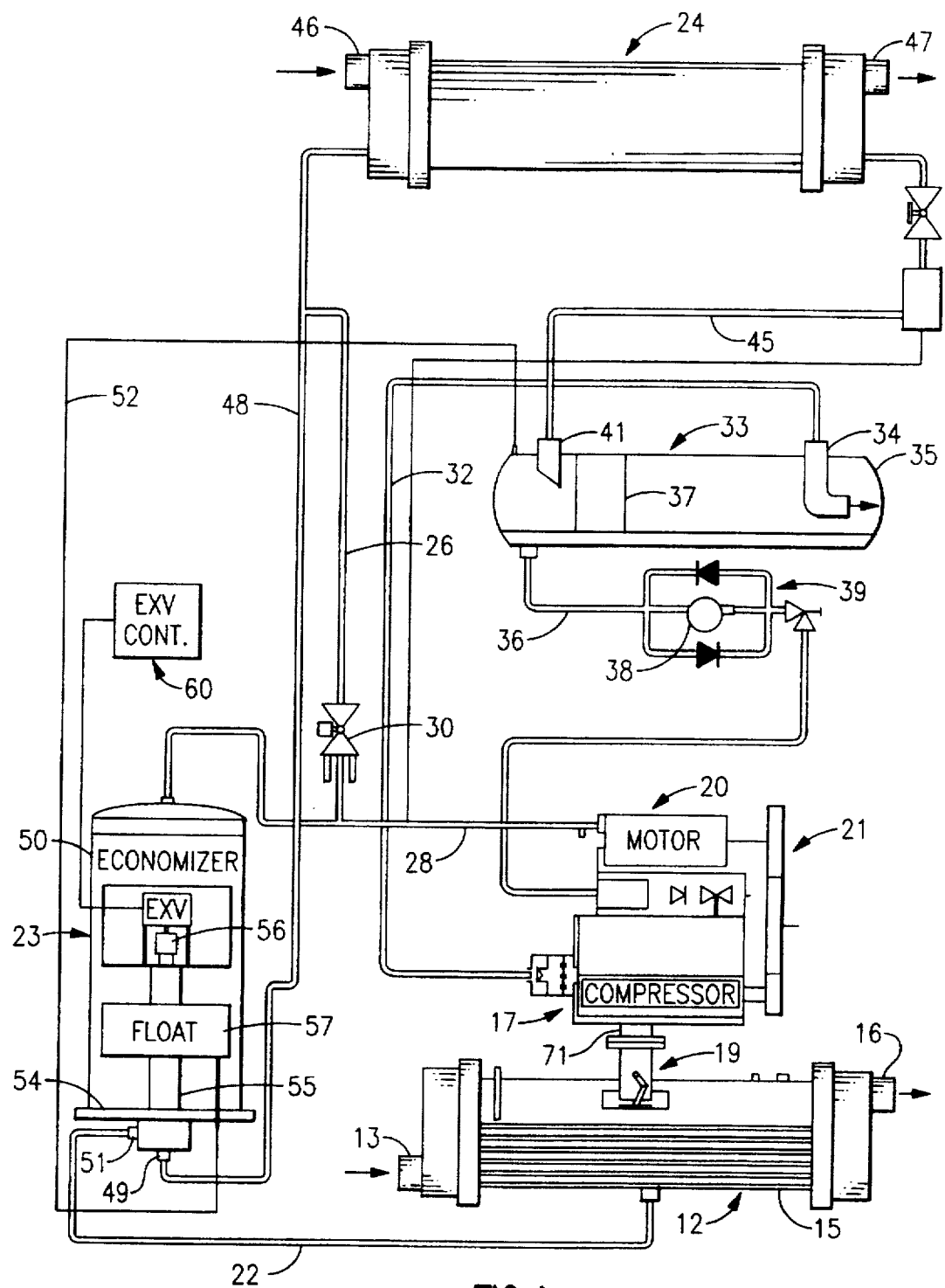
FIG. 1 is a system diagram illustrating the components of a refrigeration unit embodying the teachings of the present invention.

Referring initially to FIG. 1, there is shown a refrigeration system generally referenced 10 that embodies the teachings of the present invention. The system employs a flooded evaporator 12 to chill a liquid which, in this case, is water, but can also be other fluids. The water enters the evaporator through an entrance port 13 and is circulated through a series of heat exchanger tubes 15 before leaving the evaporator via exit port 16. The evaporator is flooded with a low temperature liquid refrigerant which absorbs heat from the water being circulated through the heat exchanger tubes. Accordingly, liquid refrigerant in the evaporator shell is reduced to a vapor which is collected in the top section of the shell. The collected vapor is exposed to the suction side of a screw compressor 17 through a nozzle containing a suction service valve 19.

Although a screw compressor is ideally suited for use in the present compact refrigeration system, the invention is not restricted to a single type of compressor and other types of compressors, such as centrifugal compressors, may be similarly employed in the practice of the subject invention. The rotors of the compressor are coupled to a motor drive 20 by means of a gear train 21. As is typical in most screw compressors, lubricating oil is distributed to the rotors and bearings of the machine. As a result, oil is circulated along with refrigerant vapor as it passes through the compressor chamber. The compressed gas is discharged from the compressor and is delivered to an oil separator 33 by means of a discharge line 32. The gas entering the separator tank is initially directed against one side wall 35 of the tank by a discharge nozzle 34. Upon impact, a portion of the oil drops down to the bottom of the tank. The remaining refrigerant and oil is then passed through a wire mesh screen 37 which serves to remove the remaining oil from the vapor phase refrigerant. The removed oil separated by the screen is again collected in the bottom of the tank and the refrigerant vapor is collected in the upper section of the tank.

An oil return line 36 is connected into the bottom of the separator tank and is arranged to conduct oil back to the compressor. A small pre-lube pump 38 is mounted in the oil return line which is activated for a short period of time at compressor start up to provide lubrication to the compressor until such time as the pressure within the system reaches a desired operating level. At this time the pre-lube pump is shut down and oil is routed to the compressor under system pressure through the check valve network 39.

Refrigerant vapor is drawn from the separator through a vapor line 45 and is delivered into the shell of condenser 24. The present system employs a water cooled condenser unit, however, it should be clear that any type of condenser known and used in the art may be similarly employed. Cooling water enters the condenser at inlet 46 and is passed through a series of heat exchanger tubes (not shown) before leaving the unit via outlet 47. Heat from the refrigerant vapor is rejected into the cooling water thus reducing the vapor to a liquid which is collected in the bottom of the tank.

The liquid refrigerant collected in the condenser is passed through a liquid line 48 to a flash tank economizer 23 embodying the teachings of the present invention. As will be explained in greater detail below, the liquid refrigerant is throttled or expanded twice within the economizer to a desired temperature and pressure before being delivered to the evaporator 12 where it is utilized to chill the water passing through heat exchanger tubes 15.

Figure 2:
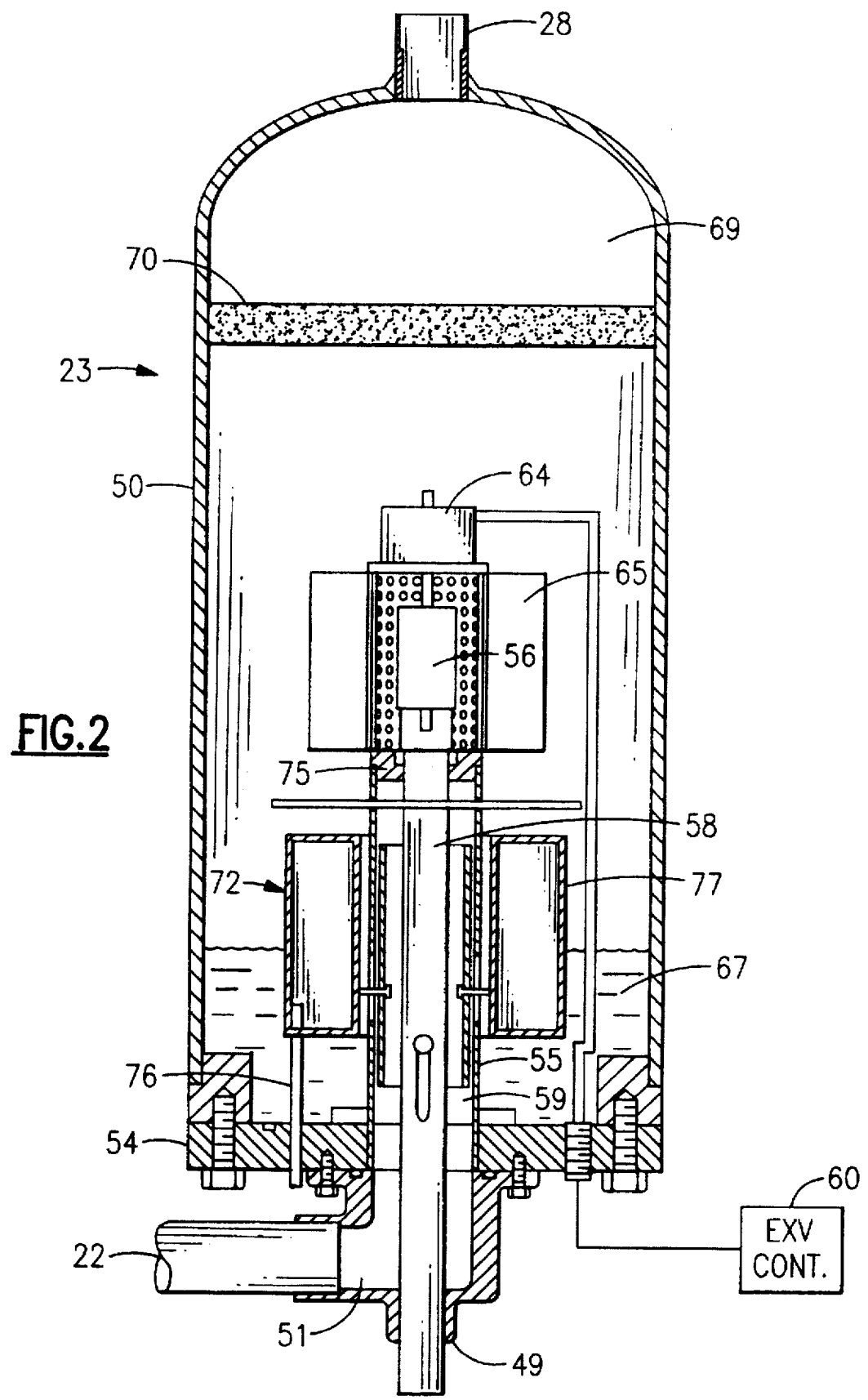
FIG. 2 is an enlarged sectional view of a flash tank economizer embodying the teachings of the present invention.

The economizer 23 is housed within a vertically disposed tank 50 that is secured to a base 54 containing a refrigerant inlet 49 (FIG. 2). A cylindrical stand pipe 55 is vertically mounted in the base and encircles a smaller diameter inlet tube 58 centrally located therein. An expansion chamber 59 is established within the gap between the stand pipe 55 and the inlet tube 58. An electronically controlled expansion valve (EXV) 56 is mounted on top of the inlet tube and the valve port opening is regulated by a motor 64. The size of the valve opening is controlled in response to an input signal from a controller 60 which receives data from a number of different points in the system. The data is processed by the controller to determine the optimum setting of valves for existing operating conditions. The operation of an electronically controlled expansion valve is further discussed in the above noted U.S. Pat. No. 4,523,435 which is incorporated herein by reference.

The EXV serves to rapidly expand the high pressure liquid refrigerant to a lower intermediate pressure that is about half-way between the condenser pressure and the evaporator pressure. The expanded refrigerant is passed through a wire screen and baffle separator 65 where the vapor phase refrigerant is separated from the liquid phase refrigerant. The liquid phase is collected in the sump 67 of the tank and the vapor phase is collected in the domed shaped upper section 69 of the tank after the vapor phase has passed through a demister 70. The vapor (or flash gas) collected in the economizer is passed back to the screw compressor 17 by means of a return line 28. Prior to being injected into the compressor, the vapor is passed through the compressor motor 20 to provide additional cooling to the motor. The flash gas is injected into the compression chamber downstream from the compressor inlet at a point where the pressure in the chamber is about equal to the intermediate pressure maintained inside the economizer tank.

Figure 3:
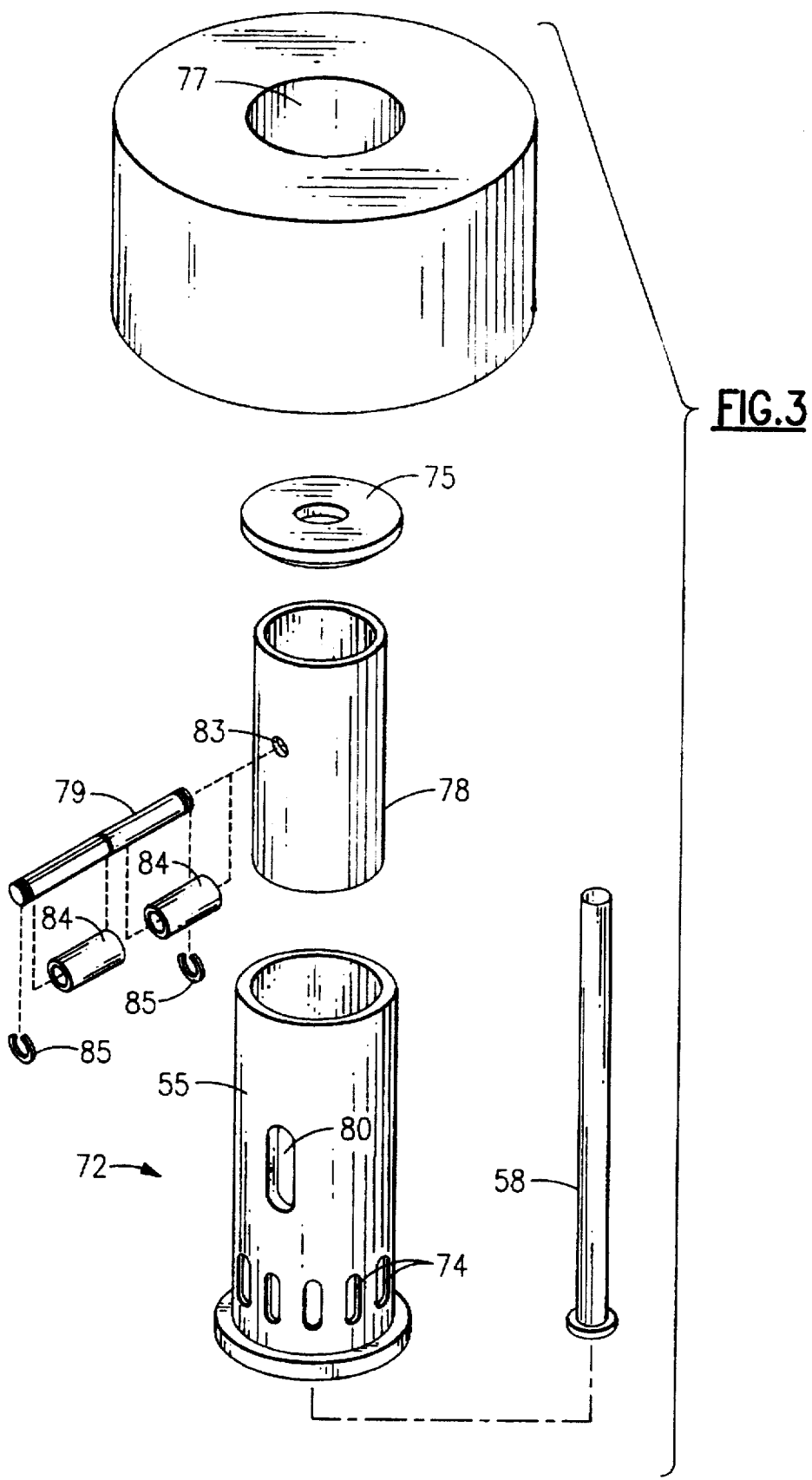
FIG. 3 is an enlarged exploded view in perspective showing the float metering device used in the economizer tank of the present invention.

The liquid refrigerant collected in the sump of the economizer tank undergoes a second expansion which reduces the pressure and temperature of the liquid phase down to that of the evaporator. The second expansion is achieved by a float controlled device 72 contained in the bottom of the economizer tank. As illustrated in FIG. 3, the stand pipe 55 contains several vertically disposed slotted openings 74—74 that are circumferentially spaced about the stand pipe. Refrigerant collected in the sump of the economizer tank is throttled through the openings into the expansion chamber 59 from which it is passed on to the evaporator 12 via liquid line 22. The top of the stand pipe is used to support the EXV assembly. An annular shaped float 77 surrounds the stand pipe and is arranged to float in the liquid refrigerant collected in the sump. A control gate in the form of a sleeve 78 is slidably contained within the stand pipe and is arranged to vary the size of the slotted openings and thus meter the flow of refrigerant into the expansion chamber. High pressure vapor from the separator tank is delivered to the float by a bubbler tube 76 which insures that the float will maintain a buoyancy above the liquid as operating conditions within the system vary.

The float is connected directly to the sleeve by means of two connecting rods 79 that pass through two elongated vertically disposed opposed aligned holes in the stand pipe. The pins extend transversely through the sleeve via holes 83 and the ends of the pins pass into the float through opposed aligned holes (not shown) formed in the inner wall of the float and are retained therein by C-shaped spring members 85. Spacers 84 are mounted on the shaft and are arranged to maintain the float and the sleeve in a spaced apart relationship so that they can move freely together in a vertical direction. The sleeve is arranged to move over the slotted opening in the standpipe to vary the size of the openings in response to the level of liquid refrigerant in the economizer tank. The operation of this type of flow controller is described in greater detail in the aforementioned U.S. Pat. No. 5,285,653 the disclosure of which is herein incorporated by reference.

Figure 4:
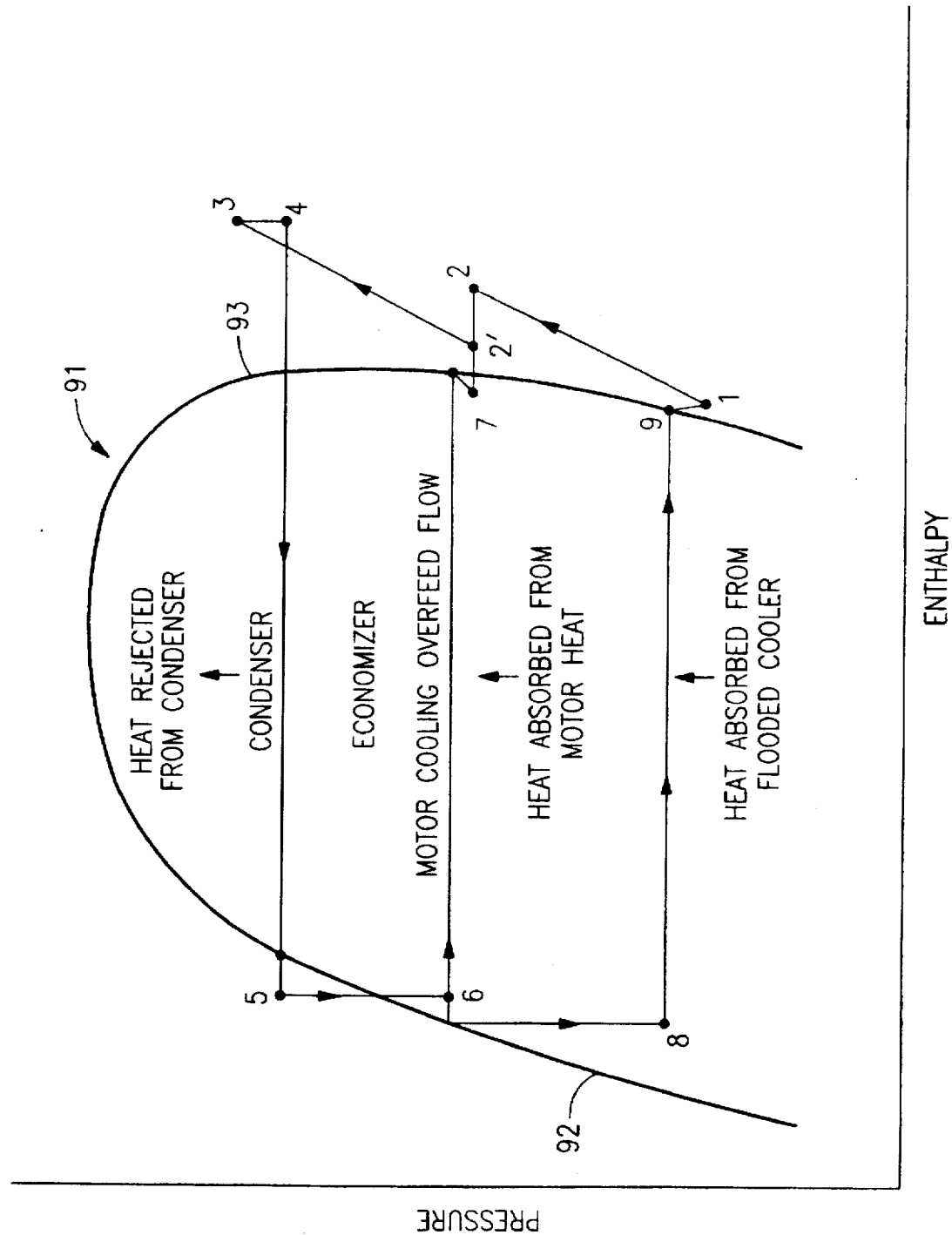
FIG. 4 is a thermodynamic PS cycle diagram of the present system wherein pressure is plotted against enthalpy.

The thermodynamic cycle of the present chiller system will be explained in further detail with reference to FIG. 4 which shows the phase changes in the refrigerant as it moves through the refrigeration loop. The refrigerant saturation curve 90 is shown on the diagram wherein pressure is plotted against enthalpy. The liquid line 92 is depicted on the left hand side of the saturation curve while the vapor line 93 is depicted on the right hand side of the curve. Initially, slightly superheated vapor enters the suction side of the compressor from the evaporator at state point 1 and is compressed to a higher pressure shown at state point 2. Vapor from the economizer is introduced into the compression chamber at state point 7 where it is combined with the in-process refrigerant vapor causing a slight loss in energy to state point 2'. The compressor continues to produce work on the combined vapor and oil until the gas reaches a discharge pressure at state point 3.

The compressed gas enters the oil separator at state point 3 wherein the oil is removed from the refrigerant and returned to the compressor. Due to the oil separation procedure, the pressure of the refrigerant vapor drops slightly to state point 4 at the entrance to the condenser.

In the condenser, the refrigerant is reduced isobarically from a superheated vapor to a liquid at state point 5 and the heat of condensation is rejected into the water passing through the condenser heat exchanger tubes. Liquid refrigerant enters the economizer at state point 5 and undergoes a first adiabatic expansion within the tank as it passes through the electronic expansion valve to an intermediate pressure at state point 6. The pressure at state point 6 is about half-way between the condenser pressure and the evaporator pressure. As a result, some of the refrigerant is vaporized within the economizer tank. The flash gas is returned to the compressor through the compressor motor to provide additional cooling to the motor. The flash gas enters the compressor at state point 7 where, as noted above, it is combined with the in process vapor at state point 2.

The remaining liquid in the economizer is expanded a second time to a lower temperature and pressure through a float controlled throttling device and is then delivered to the entrance of the evaporator at state point 8. Here the low temperature two-phase liquid absorbs heat from the liquid being chilled in the evaporator and is reduced to a vapor at state point 9. The refrigerant vapor at state point 9 is drawn into the suction side of the compressor thus completing the cycle.

As should be evident from the disclosure above, in the present invention the high side flow control device, the economizer, and the low side control devices are all combined into one compact vessel. The low side refrigerant that is developed in the expansion chamber of the economizer is placed in counterflow relation with the high side liquid flowing to the EXV. Some heat is thus transferred between the high side and low side refrigerant to increase the subcooling of the high side refrigerant as it moves into the EXV. This results in better operation of the initial expansion process. In addition, injecting vapor from the economizer directly into the screw compressor increases the capacity of the machine without changing its displacement. Tests have shown that the two step expansion process allows for about a 15% to 20% increase in compressor capacity and a 5% to 10% improvement in system efficiency.

While this invention has been explained with reference to the structure disclosed herein, it is not confined to the details set forth and this invention is intended to cover any modifications and changes as may come within the scope of the following claims:

What is claimed is:

1. A method of expanding a high pressure liquid refrigerant from a condenser of a refrigeration system to a lower pressure and temperature for delivery to the system evaporator that includes the steps of carrying out a first expansion of high pressure refrigerant from a system condenser within an economizer tank to bring said refrigerant to an intermediate pressure and temperature, separating the liquid refrigerant from the refrigerant vapor in said economizer tank after said first expansion, carrying out a second expansion of the separated liquid refrigerant in said tank to bring the separated refrigerant to a desired low pressure and temperature, and delivering said twice expanded low pressure refrigerant to a system evaporator.

2. The method of claim 1 that further includes the step of injecting the vapor developed in the economizer into a motor driven compressor employed in said system to raise the refrigerant to said high pressure.

3. The method of claim 2 that includes the further step of cooling the compressor motor with vapor from said economizer prior to injecting said vapor into the compressor.

4. The method of claim 1 wherein the first expansion step is carried out by an electronically controlled expansion valve in response to one or more sensed conditions within the refrigeration system.

5. The method of claim 1 that further includes the step of controlling the second expansion step in response to the amount of liquid refrigerant that is collected in said economizer tank.

6. The method of claim 2 wherein said vapor from the economizer tank is injected into the compressor chamber of said compressor in a region where the chamber pressure is about equal to said intermediate pressure.

7. The method of claim 1 wherein said intermediate pressure is about midway between said high pressure and said low pressure.

8. Apparatus for expanding liquid refrigerant from a high pressure to a low pressure as the refrigerant moves between the condenser and the evaporator of a refrigeration system that includes an economizer tank having a sump and an inlet for receiving high pressure liquid refrigerant from the condenser a first expansion means in said economizer tank for expanding the high pressure liquid refrigerant to an intermediate pressure so that liquid phase refrigerant is collected in the sump of said tank and vapor phase refrigerant is collected in the top section of said tank over said sump, a second expansion means for further expanding the liquid refrigerant collected in the sump of said tank to a desired low pressure, and means for delivering the low pressure refrigerant to the evaporator of said system.

9. The apparatus of claim 8 that further includes a vapor line for conducting vapor from the economizer tank to the system compressor.

10. The apparatus of claim 9 wherein said compressor is a screw compressor driven by a motor and said vapor line passes through the motor to provide cooling to said motor.

11. The apparatus of claim 8 wherein said first expansion means is an electronically controlled valve and further includes a controller for positioning said valve in response to one or more sensed system parameters.

12. The apparatus of claim 8 wherein said second expansion means includes at least one slotted metering opening, a movable gate for displacement over said slotted metering opening and a float means floating on the liquid refrigerant in said sump of the economizer tank connected to said gate to position said gate in response to the amount of liquid refrigerant contained in said sump.

13. The apparatus of claim 8 that further includes a separation means located in said tank for separating the liquid phase from the vapor phase refrigerant as it passes out of said first expansion means.

14. The apparatus of claim 1 wherein the economizer tank is vertically positioned in the system and contains a dome in the upper section thereof for collecting refrigerant vapor.

15. The apparatus of claim 14 that further includes a mist eliminator in the lower part of said dome and a vapor outlet in the upper part of the dome.

16. A flash tank economizer for use in a refrigeration system containing a condenser which is connected to an evaporator by a liquid line and a motor driven screw compressor for raising the pressure of refrigerant vapor generated in the evaporator to a high pressure and delivering the high pressure vapor to the condenser, said flash tank economizer including a vertically disposed tank connected into the liquid line having an inlet in the bottom wall thereof for receiving high pressure liquid refrigerant from the condenser, an inlet tube vertically positioned inside said tank that is connected to said inlet for bringing high pressure liquid refrigerant from the condenser to an electronically controlled expansion valve, said tank having an upper section for collecting vapor phase refrigerant and a lower sump for collecting liquid phase refrigerant, control means associated with said regulating said valve electrically controlled expansion valve for expanding high pressure liquid refrigerant to an intermediate pressure inside said tank in response to one or more sensed system parameters whereby the expanded liquid phase refrigerant is collected in the sump and vapor phase refrigerant is collected in the upper section of the tank, a stand pipe mounted vertically in the bottom wall of the tank which surrounds the inlet tube to provide an expansion chamber therebetween, means for connecting the expansion chamber to the inlet of said evaporator, at least one vertically disposed slotted opening formed in said stand pipe for placing the sump of said tank in fluid flow communication with the expansion chamber whereby liquid refrigerant passing through said slotted opening is expanded a second time to a low pressure, a gate means slidably mounted over said slotted opening for varying the size of said opening, and float means arranged to float on the liquid refrigerant contained in the sump of said tank, said float being connected to said gate to vary the size of said opening in response to the level of liquid refrigerant in said sump.

17. The flash tank economizer of claim 16 that includes a plurality of vertically disposed slotted openings circumferentially spaced about said stand pipe.

18. The flash tank economizer of claim 17 wherein said gate means is a cylindrical sleeve coaxially mounted with respect to said stand pipe.

19. The flash tank economizer of claim 16 that further includes a separating means positioned adjacent to the expansion valve for separating the vapor phase from the liquid phase of the expanded refrigerant.

20. The flash tank economizer of claim 16 wherein said float is an annular shaped member that surrounds the stand pipe.

21. The flash tank economizer of claim 20 that further includes a bubbler tube for introducing high pressure refrigerant vapor to said float means.

22. The flash tank economizer of claim 16 wherein said tank contains a vapor outlet mounted in the top section of said tank and a flash gas line for conducting vapor from the tank to the compressor for reuse in the system.

23. The flash tank economizer of claim 22 wherein said flash gas line passes through the compressor motor to provide additional cooling to said motor.

24. The flash tank economizer of claim 23 that further includes a mist eliminator mounted in the top section of said tank for demisting the vapor before it enters the flash gas line.

25. The flash tank economizer of claim 22 wherein said flash gas line injects vapor from the economizer into the compressor chamber of the compressor at a point where the chamber pressure is about equal to said intermediate pressure.

26. The apparatus of claim 13 wherein said separation means comprises a wire screen and baffle separator.

* * * * *